Aug. 28, 1951 M. M. SKY 2,566,148
TRUSS FOR HERNIA
Filed July 2, 1948
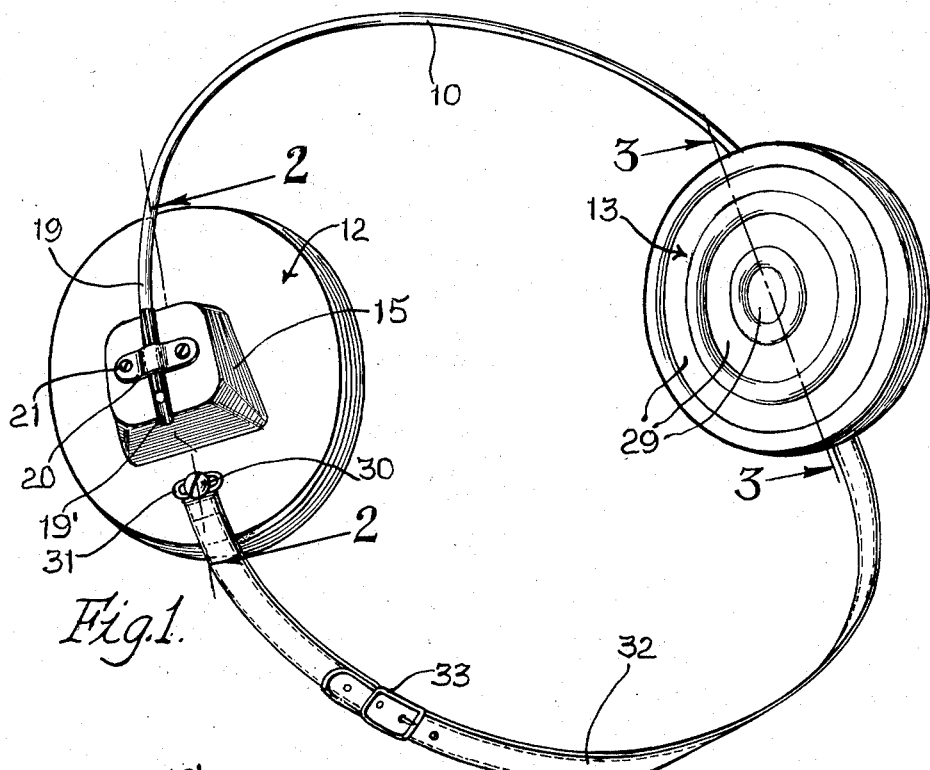
Fig.1.
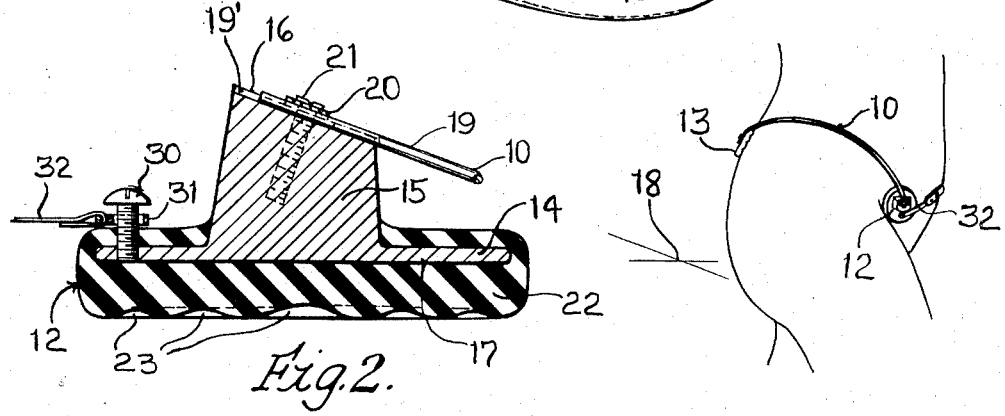
Fig.2.
Fig.4.
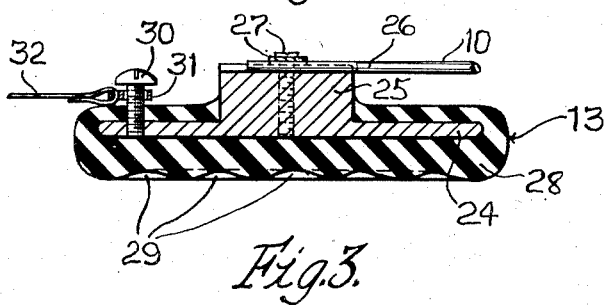
Fig.3.
INVENTOR.
Matthew M. Sky
BY Clarence E. Threedy
His Attorney.

Patented Aug. 28, 1951

2,566,148

UNITED STATES PATENT OFFICE 2,566,148

TRUSS FOR HERNIA

Matthew M. Sky, Chicago, Ill.

Application July 2, 1948, Serial No. 36,620

1 Claim. (Cl. 128—117)

This invention relates to certain new and useful improvements in trusses for hernia and has for its principal object to provide a simple and effective truss which can be readily adjusted in proper position, worn with comfort, and which, when adjusted, will dispose the pressure pads thereof upon the affected area in a manner such that the pads will exert the maximum degree of pressure without discomfort to the wearer and without likelihood of being shifted or displaced.

Another and equally important object of the invention is the provision of a truss for the purposes herein set forth in which there are provided pressure pads related to the spring band of the truss in a manner such that the pads will have a flat application to the affected area, thereby reducing to a minimum the possibility of shifting or moving of the truss, while receiving the maximum pressure from the spring band.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a view in perspective of my improved truss;

Fig. 2 is a sectional detail view of the front pressure pad, taken substantially on line 2—2 of Fig. 1;

Fig. 3 is a sectional detail view of the back pressure pad, taken substantially on line 3—3 of Fig. 1;

Fig. 4 is a perspective view of my improved truss in an applied position.

The several objects of my invention are accomplished by the preferred form of construction of my improved truss as shown in the accompanying drawings.

In this connection, 10 indicates a semi-circular metallic truss band preferably formed of spring material for pressure-exerting purposes.

To the opposite ends of this band are connected pressure pads 12 and 13.

The pressure pad 12 comprises a circular disc 14 of relatively flat formation. Extending from this disc 14 is a hub 15. This hub 15 is preferably formed as an integral part of the disc 14.

The top surface 16 of the hub 15 and the surface 17 of the disc 14 taper toward each other along imaginary lines which, when extended, intersect each other at a point 18 substantially spaced from the axis of the disk 14.

This hub 15 is connected to the end 19 of the spring band 10. This is accomplished by means of a clamp plate 20 secured to the hub 15 by screws 21.

As shown, the band 10 is round in cross section and the end 19 thereof is knurled longitudinally and seated in a groove 19' formed in the hub 15.

The disc 14 is encased within a resilient cover 22 preferably formed of rubber or like pliable or compressible material.

The outer face of the cover 22 is provided with a plurality of concentrically arranged grooves 23 whereby to reduce the area of the pad intended to engage the body. This construction materially reduces heat generation.

The pad 13 comprises a disc 24 likewise of relatively flat formation. This disc 24 provides a hub 25 to which the opposite end portion 26 of the spring band 10 is attached by means of a clamp plate and screw 27 or by any other approved or well-known attaching means. This disc 24 is likewise encased within a cover 28 constructed substantially the same as the cover 22 and provided with concentrically arranged grooves 29 in its outer face.

Each disc 14 and 24 carries a head-bearing screw 30 to which the loop 31 of a securing strap 32 is attached. This securing strap 32 may be of any approved construction, including a buckle 33, which permits the strap to be separated to allow convenient removal of the truss.

The circumferential grooves formed in the pads 12 and 13 not only reduce heat generation to a minimum but also serve to prevent slipping or movement of the pads when in applied position.

By inclining the surfaces of the hub 15 of the disc 14 in the manner herein described (which inclined surface will be substantially parallel with the body of the wearer when the apparatus is in applied position), the pressure exerted by the spring band upon the pad will be a direct pressure and not at an inclination with respect to the body, thereby serving to transmit the maximum of pressure to the affected area from the spring band. This arrangement also eliminates the possibility of slippage of the pads which would otherwise result by reason of pressure being applied to the pad at an angle with respect thereto.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A truss comprising a substantially semi-circular spring elongated band, truss pads at each end of said band and each comprising a disc and an integral hub provided by the disc and a resilient pad covering the disc, said disc being embedded in said covering pad, means connecting the opposite end portions of the band to the hubs of the truss pads, a securing belt comprising two sections, a buckle connecting adjacent end portions of said sections together, and means for connecting the opposite end portions of the sections to the discs of the truss pads, the top surface of the hub and the outer surface of the disc of one of said truss pads being tapered along lines intersecting each other at a point remote from the axis of said disc.

MATTHEW M. SKY.

REFERENCES CITED

The following references are of record in the file of this patent:

UNITED STATES PATENTS

| Number | Name | Date |
|---|---|---|
| 736,356 | Brooks | Aug. 18, 1903 |
| 906,350 | Windisch | Dec. 8, 1908 |
| 1,237,709 | Seeley | Aug. 21, 1917 |
| 1,556,079 | Cobb | Oct. 6, 1925 |
| 2,142,073 | Dobbs | Dec. 27, 1938 |

FOREIGN PATENTS

| Number | Country | Date |
|---|---|---|
| 152,170 | Great Britain | Oct. 14, 1920 |